(12) United States Patent
Decker et al.

(10) Patent No.: US 9,733,147 B2
(45) Date of Patent: Aug. 15, 2017

(54) METHOD FOR TESTING A LEAKAGE DETECTION SYSTEM

(71) Applicant: Inficon GmbH, Cologne (DE)

(72) Inventors: Silvio Decker, Cologne (DE); Michael Dauenhauer, Cologne (DE)

(73) Assignee: Inficon GmbH, Köln (DE)

( * ) Notice: Subject to any disclaimer, the term of this patent is extended or adjusted under 35 U.S.C. 154(b) by 100 days.

(21) Appl. No.: 14/440,464

(22) PCT Filed: Nov. 4, 2013

(86) PCT No.: PCT/EP2013/072955
§ 371 (c)(1),
(2) Date: May 4, 2015

(87) PCT Pub. No.: WO2014/068118
PCT Pub. Date: May 8, 2014

(65) Prior Publication Data
US 2015/0276541 A1    Oct. 1, 2015

(30) Foreign Application Priority Data
Nov. 5, 2012 (DE) .......... 10 2012 220 108

(51) Int. Cl.
*G01M 3/02* (2006.01)
*G01M 3/00* (2006.01)

(52) U.S. Cl.
CPC .................. *G01M 3/007* (2013.01)

(58) Field of Classification Search
CPC ....... G01M 3/02; G01M 3/007; G01M 3/3263

USPC .......................................... 73/1.58
See application file for complete search history.

(56) References Cited

U.S. PATENT DOCUMENTS

| | | | | |
|---|---|---|---|---|
| 3,516,278 A | * | 6/1970 | Klein .................. | G01N 1/4022 392/473 |
| 4,794,784 A | * | 1/1989 | Bley ..................... | G01M 3/207 73/1.03 |
| 4,991,426 A | * | 2/1991 | Evans ..................... | G01M 3/24 73/1.05 |
| 5,363,689 A | * | 11/1994 | Hoffmann ................ | G01F 1/68 73/1.17 |

(Continued)

FOREIGN PATENT DOCUMENTS

| | | |
|---|---|---|
| CN | 1519549 A | 8/2004 |
| CN | 101726396 A | 6/2010 |

(Continued)

*Primary Examiner* — Natalie Huls
(74) *Attorney, Agent, or Firm* — The Webb Law Firm

(57) ABSTRACT

A method for testing a leak detector by using a leak detection device having a test leak and which is provided with a cavity that can be filled with gas, including the following steps:
  a) filling the cavity with ambient air up to an interior pressure in the interior of cavity that corresponds to ambient atmospheric pressure,
  b) establishing an exterior pressure in the area surrounding the leak detection device that is lower than the interior pressure,
  c) measuring the leakage rate of the air flowing through the test leak from the interior to the exterior of the leak detection device, and
  d) establishing an atmosphere consisting of ambient air with ambient atmospheric pressure as exterior pressure in the area surrounding the leak detection device.

12 Claims, 1 Drawing Sheet

(56) References Cited

U.S. PATENT DOCUMENTS

| | | | | |
|---|---|---|---|---|
| 5,386,717 | A | * | 2/1995 | Toda ............ G01M 3/202 348/E5.105 |
| 5,907,093 | A | | 5/1999 | Lehmann |
| 6,082,184 | A | * | 7/2000 | Lehmann ......... G01M 3/3281 73/49.3 |
| 6,595,040 | B1 | | 7/2003 | Widt et al. |
| 2007/0157704 | A1 | * | 7/2007 | Jenneus ............ G01M 3/226 73/40.7 |
| 2010/0313634 | A1 | * | 12/2010 | Wetzig ............ G01M 3/226 73/40.7 |
| 2011/0113861 | A1 | * | 5/2011 | Maehira ........... G01M 3/229 73/40.7 |
| 2011/0113862 | A1 | * | 5/2011 | Maehira ........... G01M 3/229 73/40.7 |
| 2014/0053636 | A1 | * | 2/2014 | Ghosh ............. G01M 3/007 73/40.5 R |
| 2015/0192489 | A1 | * | 7/2015 | Decker ............ G01M 3/02 73/40 |
| 2015/0323408 | A1 | * | 11/2015 | Yoshida .......... G01L 27/002 73/1.58 |
| 2016/0146694 | A1 | * | 5/2016 | Decker ........... G01M 3/007 73/1.57 |

FOREIGN PATENT DOCUMENTS

| | | |
|---|---|---|
| DE | 19906941 A1 | 8/2000 |
| DE | 19963073 A1 | 6/2001 |
| DE | 10154467 A1 | 7/2003 |
| DE | 102010014377 A1 | 10/2011 |
| WO | 2016005555 A1 | 1/2016 |

\* cited by examiner ately, the test leak device can also be designed separate from the test specimen and, for example, be affixed to a test specimen on the outside.

The invention is based on the objective of proposing an improved method for testing a leakage detection system by using a test leak device that has been provided with a test leak.

METHOD FOR TESTING A LEAKAGE DETECTION SYSTEM

CROSS-REFERENCE TO RELATED APPLICATIONS

This application is the United States national phase of International Application No. PCT/EP2013/072955 filed Nov. 4, 2013, and claims priority to German Patent Application No. 10 2012 220 108.4 filed Nov. 5, 2012, the disclosures of which are hereby incorporated in their entirety by reference.

BACKGROUND OF THE INVENTION

Field of the Invention

The invention relates to a method for testing a leakage detection system by using a test leak device that is provided with a test leak.

Description of Related Art

When testing or calibrating leakage detection systems used for testing test specimens for leak tightness, test leaks having a specified, known leakage rate are used. The test leak is a component of a test leak device that has a cavity that can be filled with air. The test leak is formed in a wall that surrounds the cavity of the test leak device. Typically, the test specimens consist of the packaging for groceries, pharmaceuticals, or the sterile packaging of objects used in the medical field. The leak detection test is used in order to identify leakages in the packaging that could lead to spoilage of the packaged product. The test specimen that is to be tested for leak tightness has a thin wall that forms the packaging of the product.

The test leak device can be affixed to the outside of the wall of the test specimen, or tested independent of the test specimen.

The leak detection test is performed automatically by using leakage detection systems. Given the background that even small leakages in packaging can lead to the spoilage of the packaged product, the leakage detection systems and the leak detectors must be able to identify small leaks with a high degree of reliability. The leakage detection systems must be tested at regular intervals and if necessary, calibrated. To do so, a test leak is formed in the wall surrounding a leak test device that has a known, specified leakage rate.

Measuring the leakage rate of such a test leak for the purpose of testing a leakage detection system is known. To do so, the cavity of the test leak device is filled with a gas (most often air), and thereby, the test leak is subjected to pressure from the inside. The cavity is designed as a closed volume having a specified and known leakage rate through the test leak. The leakage rate is defined by the reference value of the test leak and by the difference in pressure between the interior pressure within the cavity and the exterior pressure outside of the test leak device. After the cavity of the test leak device has been filled once at the start of the test, the interior pressure of the test leak device decreases from one test to the next test as the result of the gas that escapes during the test. This decrease in pressure increases in direct proportion to the leakage rate and the frequency of using the test leak. As a result, the leakage rate of the test leak device steadily decreases and the test leak device must be refilled manually, or the test leak must be calibrated anew.

The test leak device can be, for example, a test specimen, i.e. a food package or packaging of another type. Alter-

SUMMARY OF THE INVENTION

The method according to the invention includes:
a) the cavity of the test leak device is filled with ambient air until an interior pressure P1 prevails in the interior of the cavity that corresponds to the ambient atmospheric pressure,
b) then, an exterior pressure P2 is established in the area exterior to the test specimen that is lower than the interior pressure P1,
c) after that, the leakage rate of the air flowing through the test leak from the inside to the outside is measured, and
d) finally, the exterior pressure P2 in the area surrounding the test leak device is increased to the ambient atmospheric pressure.

The steps of the method a), b), c) and d) are performed sequentially in this sequence. When the cavity is filled with ambient air and subsequently, according to b) the exterior pressure P2 that is surrounding the test leak device is reduced to a pressure below the atmospheric pressure, the interior pressure of the cavity is higher than the exterior pressure outside of the cavity. Consequently, the air flows out of the cavity through the test leak from the inside to the outside. While the air is flowing out, the leakage rate of the test leak is measured or determined by means of a known method for leakage testing such as, for example, measuring the rise in pressure outside of the test leak device.

After the measurement or the determination has been concluded, the test leak device is then exposed to an atmosphere of ambient air that surrounds the test leak device with an ambient atmospheric pressure as exterior pressure P2. The exterior pressure of the area surrounding the test leak device is then higher than the interior pressure in the interior of the cavity so that the air flows from the atmosphere exterior to the test leak device through the test leak into the interior of the test leak device, as a result of which the test leak device is once again filled with ambient air. The exterior atmospheric pressure is maintained until the interior pressure in the cavity corresponds to the ambient atmospheric pressure. The method can then be repeated in order to perform additional tests.

The test leak device should be filled through the test leak at ambient atmospheric pressure. To accelerate the filling of the cavity, the wall of the test leak device surrounding the cavity can, in addition to the test leak, be provided with a pressure control valve that opens automatically as soon as the ambient exterior pressure surrounding the test leak device exceeds the interior pressure within the cavity.

Atmospheric pressure is considered to be a pressure ranging between 980 and 1050 mbar, preferably, ranging between 1000 and 1020 mbar and, particularly preferred, approximately 1013 mbar.

The exterior pressure in the area exterior to the test leak device in method step b) can advantageously be a vacuum pressure of less than 300 mbar (low vacuum) or less than $10^{-3}$ mbar (fine vacuum).

When the test leak device is refilled by using method step d), the interior pressure P1 in the interior of the cavity is lower than the exterior pressure P2 in the area surrounding the test leak device. At least when performing steps c) and d), the test leak should be open so that ambient air can flow through the test leak. In the case of an additional pressure control valve, the valve opens automatically as soon as the exterior pressure P2 is larger than the interior pressure P1 in order to accelerate the filling of the cavity with ambient air.

Advantageously, the method steps a) through d) are performed at least once and, in particular, several times in sequence whereby method step a) of a subsequent test follows method step d) of a preceding test. Thereby, as a result of method step d), method step a) of a respectively subsequent test is performed and in this way, the cavity is refilled until ambient atmospheric pressure prevails in the interior of the cavity.

The invention provides the advantage that the test leak device, in particular, in the case of rising pressure measurements for large rates of leakage, is automatically refilled without requiring any active filling of the test leak device. The test leak device fills automatically and as a result, it is almost maintenance-free.

BRIEF DESCRIPTION OF THE DRAWINGS

In the following an exemplary embodiment of the invention is explained in more detail with the help of the Figures. Shown are.

DESCRIPTION OF THE INVENTION

The Figures show test leak device 10 in a schematic cross section. Test leak device 10 has a wall 14 that has a test leak 16 in the form of a hole in the wall and surrounds a cavity 12. A test leak 16 can be a permeation leak, a capillary, an adjustable aperture or a simple hole with a small diameter.

Figure 1:
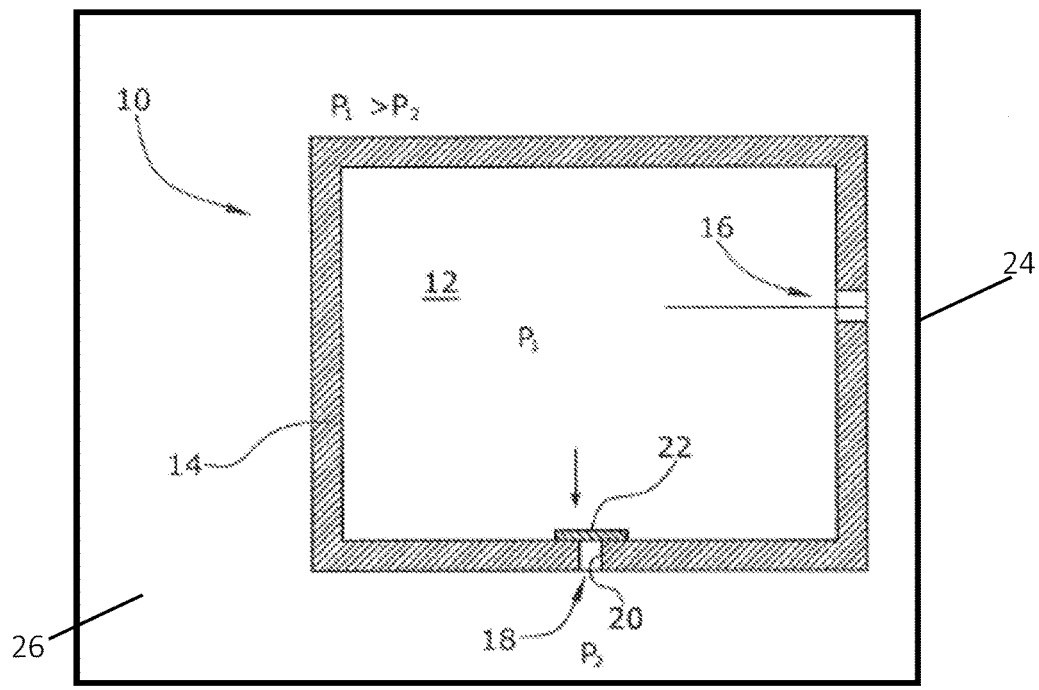
FIG. 1 shows a schematic illustration of a test leak device during the measurement of the leakage rate.
Figure 2:
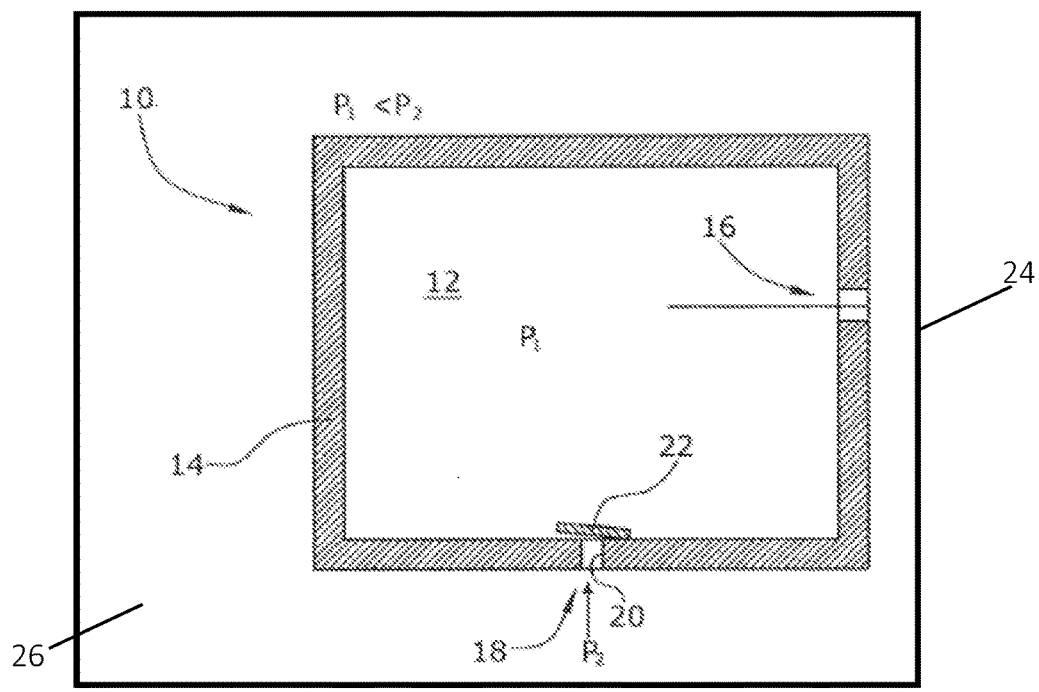
FIG. 2 shows the illustration according to FIG. 1 during refilling.

A pressure control valve 18 is formed in a different section of wall 14. Pressure control valve 18 consists of a hole 20 and a membrane 22 that presses against wall 14 from the inside in the area of hole 20 in the presence of overpressure and seals the hole. This is shown in FIG. 1. In the presence of exterior overpressure as is shown in FIG. 2, the air flowing through hole 20 from the outside presses membrane 22 inward, as a result of which pressure control valve 18 opens and air can flow into cavity 12.

When testing a leakage detection system 24—in a first step—cavity 12 is filled with air from the environment of the test leak device until the interior pressure P1 in the interior of cavity 12 corresponds to an atmospheric pressure of approximately 1013 mbar. When filling cavity 12 for the first time, the exterior pressure P2 outside of cavity 12 should be at least the atmospheric pressure to which the interior pressure P1 should be adjusted.

After the cavity has been filled, the exterior pressure P2 outside of cavity 12, i.e. pressure P2 that prevails in the area surrounding test leak device 10 is lowered to a vacuum pressure that is lower than the interior pressure P1. A typical vacuum pressure is lower than 300 mbar.

After the exterior pressure P2 has been lowered with respect to the interior pressure P1, the leakage rate of the gas flowing through the test leak from the inside toward the outside is measured by means of measuring the increase in the exterior pressure P2.

Thereby, the test leak device is contained in a gas-tight test chamber 26 so that pressure P2 is increased only by the test leak.

While performing the measurement, the interior pressure P1 falls continuously with respect to the exterior pressure P2 and approximates the exterior pressure P2 over time, while the exterior pressure P2 rises. After the leakage rate has been measured, the test leak device 10 is placed into a gaseous atmosphere consisting of ambient air at atmospheric pressure. The exterior pressure P2 is then at least 1000 mbar (atmospheric pressure) and is thus higher than the interior pressure P1 that prevails in the interior of cavity 12. The air surrounding test leak device 10 then flows through test leak 16 and through pressure control valve 18 into cavity 12 automatically, until the interior pressure P1 corresponds to the exterior ambient pressure P2. As soon as the interior pressure P1 corresponds to the exterior pressure P2, or at least to an adequate atmospheric pressure of at least 980 mbar, the cavity is refilled for performing a new test. For the new test, steps b), c) and d) can then be used.

What is claimed is:

1. A method for testing a leakage detection system using a test leak device that is located in a test chamber of the leakage detection system, wherein the test leak device is provided with a test leak and has a cavity that can be filled with a gas, having the steps:
   a) filling the cavity of the test leak device with ambient air until an interior pressure in the interior of the cavity corresponds to ambient atmospheric pressure,
   b) establishing an exterior pressure in the test chamber in the area surrounding the test leak device that is lower than the interior pressure in the cavity,
   c) measuring of the leakage rate of the air flowing from the cavity into the test chamber through the test leak of the test leak device, and
   d) establishing an exterior pressure in the test chamber in the area surrounding the test leak device using an atmosphere consisting of ambient air with an ambient atmospheric pressure.

2. The method as claimed in claim 1, wherein, during the filling of the cavity according to step a), an exterior pressure in the test chamber in the area surrounding the test leak device is ambient, atmospheric pressure.

3. The method as claimed in claim 1, wherein the filling of the cavity takes place through the test leak.

4. The method as claimed in claim 1, wherein the ambient atmospheric pressure is a pressure ranging between 980 mbar and 1050 mbar.

5. The method as claimed in claim 4, wherein the ambient atmospheric pressure is a pressure ranging between 1000 mbar and 1020 mbar.

6. The method as claimed in claim 4, wherein the ambient atmospheric pressure is approximately 1013 mbar.

7. The method as claimed in claim 1, wherein the exterior pressure in method step b) is a vacuum pressure.

8. The method as claimed in claim 1, wherein an interior pressure in the cavity in method step d) is lower than the exterior pressure in the test chamber in the area surrounding the test leak device.

9. The method as claimed in claim 1, wherein the test leak is open at least while method steps c) and d) are being performed.

10. The method as claimed in claim 1, wherein the test leak device is provided with a pressure control valve for refilling that opens automatically when the exterior pressure exceeds the interior pressure.

11. The method as claimed in claim 1, wherein the leakage rate according to step c) is measured by the increase in the exterior pressure within the test chamber.

12. The method as claimed in claim 1, wherein the method steps a) through d) are repeated at least once, whereby the filling of the cavity according to step a) is performed by means of method step d).

* * * * *